United States Patent
Liu et al.

(10) Patent No.: US 8,929,491 B2
(45) Date of Patent: Jan. 6, 2015

(54) INTERFERENCE CANCELLATION METHOD WITH MULTIPLE DATA LAYER MIMO TRANSMISSION

(71) Applicant: Sequans Communications, Colombes (FR)

(72) Inventors: Yang Liu, Paris (FR); Serdar Sezginer, Saint-Cloud (FR)

(73) Assignee: Sequans Communications, Colombes (FR)

( * ) Notice: Subject to any disclaimer, the term of this patent is extended or adjusted under 35 U.S.C. 154(b) by 0 days.

(21) Appl. No.: 13/685,234

(22) Filed: Nov. 26, 2012

(65) Prior Publication Data

US 2013/0163704 A1 Jun. 27, 2013

(30) Foreign Application Priority Data

Nov. 25, 2011 (EP) .................................... 11306565

(51) Int. Cl.
*H03D 1/04* (2006.01)
*H04L 25/03* (2006.01)
*H04J 11/00* (2006.01)
*H04L 1/00* (2006.01)

(52) U.S. Cl.
CPC ....... *H04L 25/03006* (2013.01); *H04J 11/0036* (2013.01); *H04L 1/005* (2013.01); *H04L 1/0061* (2013.01); *H04L 25/03286* (2013.01); *H04L 2025/03426* (2013.01)
USPC ........... 375/346; 375/144; 375/148; 455/63.1

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| | | | |
|---|---|---|---|
| 2006/0121946 A1* | 6/2006 | Walton et al. ................. | 455/561 |
| 2007/0162827 A1* | 7/2007 | Walton et al. ................. | 714/774 |
| 2011/0051858 A1 | 3/2011 | Salvekar et al. | |

OTHER PUBLICATIONS

A. Hottinen, O. Tirkkonen, and R. Wichman, "Multi-Antenna Transcive Techniques for 3G and Beyond", 2003, pp. 82-85.
C. Berrou, A. Glavieux, and P. Thitimajshima "Near Shannon Limit Errorcorrecting Coding and Decoding: Turbo-codes" May 1993.

(Continued)

*Primary Examiner* — Adolf Dsouza
(74) *Attorney, Agent, or Firm* — David D. Brush; Westman, Champlin & Koehler, P.A.

(57) ABSTRACT

A method and apparatus are provided for cancelling interferences of a received MIMO RF signal. The method includes: receiving a signal y; an initial step of obtaining, from the received signal y, at least one data representative of the received signal, called decoded data; computing the decoded data as a function of at least one predetermined criterion, delivering feedback data and a feedback decision; and, as a function of the feedback decision, at least one iteration of the following steps: constructing a set of feedback symbols from the feedback data; obtaining, from the set of feedback symbols, at least one data representative of a feedback decoded signal, called feedback decoded data; computing the at least one feedback decoded data as a function of the at least one predetermined criterion, delivering the feedback data.

6 Claims, 3 Drawing Sheets

(56) References Cited

OTHER PUBLICATIONS

Yang Liu et al "Simplified EM Channel Estimation in LTE System" May 22, 2011.

Songsri Sirianunpiboon, Yiyue Wu, A. Robert Calderbank, and Stephen D. Howard "Fast Optimal Decoding of Multiplexed Orthogonal Designs by Conditional Optimization" Mar. 2010.

D. Wubben, R. Bohnke, V. Khun, and K.-D. Kammeyer "MMSE extension of V-BLAST based on sorted QR decomposition," Oct. 2003.

Jiankang Zhang et al "Channel code aided decision-direction channel estimation for MIMO OFDM/SDMA systems based on the expectation-conditional maximization either algorithm" Dec. 6, 2010.

Jiankang Zhang et al "Joint decision-directed channel and noise-variance estimation for MIMO OFDM/SDMA systems based on expectation-conditional maximization" Jun. 1, 2011.

A. Hottinen et al., "Multi-Antenna Transcive Techniques for 3G and Beyond" 2003.

* cited by examiner

INTERFERENCE CANCELLATION METHOD WITH MULTIPLE DATA LAYER MIMO TRANSMISSION

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to data transmission techniques. More specifically, the disclosure relates to wireless data transmission techniques in a multiple input multiple output (MIMO) environments. Such an environment is characterized by the fact that signal transmission (which comprises the data) is realized by equipment which comprises at least two transmission antennas and signal reception is treated by equipment which comprises at least two reception antennas.

Multiple antenna technologies have become commonplace in wireless communications systems in order to provide spatial diversity and improve performance and/or provide spatial multiplexing (SM) and increase the transmitted data rate.

However, detection of MIMO signal remains an important challenge for mobile manufacturer. Indeed, it is necessary providing techniques which take advantage of the hardware possibility and are not over consuming available resources while reducing the complexity of calculation.

BACKGROUND OF THE DISCLOSURE

The maximum a posteriori (MAP) algorithm provides the optimum performance for MIMO detection. However, the MAP algorithm has high complexity, which makes it unacceptable in practical cases. Even though some simplified versions are proposed, e.g. max-log MAP (MLM), they still suffer from high complexity problem. When the a priori information is not available or the transmitted symbols are uniformly distributed, the MAP algorithm becomes the maximum likelihood (ML) algorithm. The ML is a powerful detection algorithm for multi-input multi-output (MIMO) transmission, e.g. SM transmission mode. However, it also has a high complexity especially for higher level modulation schemes such as 64-QAM, and multiple data layers, e.g. two code words transmitted simultaneously through SM transmission mode. This high complexity makes the ML detection unfeasible in practical communication systems.

In order to have a lower complexity, the conditional maximum likelihood (ML) algorithm may be considered as the detection algorithm at the receiver. In such a receiver, symbols in one layer are decoded by assuming that symbols in other layers are estimated. With this algorithm, for decoding one group of symbols, the number of distances to be calculated will be $O(M^{L-1})$ instead of $O(M^L)$, where M denotes the constellation size and L corresponds to the number of symbols to be detected in one group. For example, for MIMO (2×2) transmission using SM with two code words, only 2M distances are calculated instead of $M^2$ distance calculations.

With MIMO transmission, multiple code words are transmitted in parallel through multiple layers from multiple antennas and, consequently, a superposition of these layers arrives at receiver antennas. For the purpose of detecting the transmitted symbols, interference cancellation (IC) methods are being investigated. One of the popular approaches is the successive interference cancellation (SIC). With the SIC, symbols in different layers are detected step-by-step and the estimated interference is successively removed from the received superimposed signals. Furthermore, the SIC allows to simplify the hardware design, since equalization and decoding of different layers can utilize the same equalizer and decoder one after another. This SIC principle has been integrated with different equalization algorithms resulting in different SIC methods. Most popular ones are minimum mean square error (MMSE) equalizer based SIC (MMSE-SIC) and zero forcing (ZF) equalizer based SIC (ZF-SIC). The SIC is even investigated for MLM detector and it is named MLM-SIC.

The SIC detection improves system performances remarkably, especially the MLM-SIC method. However, the SIC method always needs to decide which layer should be decoded first and which one should be followed. The performance of SIC is seriously impacted by this order. In order to obtain an appropriate order, a special module sorting all layers is indispensable, resulting in more calculation efforts. Based on some criteria, the calculation efforts can be remarkable.

In recent years, with the appearance of "turbo principle", iterative receivers are becoming more and more popular and promising because of their attractive performances. Different mechanisms have already been proposed and studied. The IC process can also benefit from the "turbo principle". For example, based on MLM-SIC, the Iterative MLM-SIC is proposed. The Iterative MLM-SIC utilizes "soft" information from channel decoder instead of hard decision used by MLM-SIC. With this Iterative MLM-SIC, system performances are improved. However, the order of decoding is still needed. The Iterative MMSE-IC has also been proposed and investigated. It can provide ML like performance; however, the equalizer coefficients have to be updated at each iteration, resulting in a very high complexity. Even though some simplified versions have been proposed, they come with performance degradation.

Thus there is a need for proposing less complex and more efficient decoding process.

SUMMARY

An embodiment of the invention relates to a method for cancelling interferences of a received MIMO RF signal.

According to an embodiment of the invention said method comprises:
a step of receiving a signal y;
an initial step of obtaining, from said received signal y, at least one data representative of said decoded signal, called decoded data;
computing said at least one decoded data in function of at least one predetermined criterion, delivering feedback data and a feedback decision;
and, in function of said feedback decision, at least one iteration of the following steps:
constructing a set of feedback symbols from said feedback data;

a step of obtaining, from said set of feedback symbols, at least one data representative of a feedback decoded signal, called feedback decoded data;

computing said at least one feedback decoded data in function of said at least one predetermined criterion, delivering feedback data;

According to a specific embodiment, step of computing said at least one decoded data in function of said at least one predetermined criterion comprises:

a step of obtaining at least two cyclic redundancy checks from said decoded data;

a step of obtaining a criterion to applied to said at least two cyclic redundancy checks, a step of comparing said at least two cyclic redundancy checks; and a step deciding whether feedback data are delivered for further processing in function of said step of comparing and said criterion, delivering a feedback decision.

According to a specific embodiment said at least one predetermined criterion belongs to the groups comprising:

hard decision criterion in which a decision of feedback is took when the values of said at least two CRCs are different;

soft decision criterion in which a decision of feedback is took when at least one of the two CRC is wrong.

According to a specific embodiment the number of iteration is function of said criterion and in function of said at least two CRC values.

According to a specific embodiment said initial step of obtaining at least one decoded data comprises, for M symbols of a current layer of said signal, at least M iterations of the following steps:

a step of estimating a given symbol of said layer of said signal;

a step of mapping a complex value to the closest point in a constellation of said estimated symbol, delivering an hard estimate;

a step calculating of a distance associated to said hard estimate of in function of said received symbol, said constellation;

and, once the M distances have been calculated, a step calculating log-likelihood rations (LLR) in function of said calculated distances;

a step of decoding said log-likelihood rations (LLR), delivering said decoded data.

An embodiment of the invention also relates to an apparatus for cancelling interferences of a received MIMO RF signal.

According this embodiment, said apparatus comprises:
means of receiving a signal y;
means of obtaining, from said received signal y, at least one data representative of said decoded signal, called decoded data;
means of computing said at least one decoded data in function of at least one predetermined criterion, delivering feedback data and a feedback decision;
means of constructing a set of feedback symbols from said feedback data;
means of obtaining, from said set of feedback symbols, at least one data representative of a feedback decoded signal, called feedback decoded data;
means of computing said at least one feedback decoded data in function of said at least one predetermined criterion, delivering feedback data;

An embodiment of the invention also relates to a computer program product downloadable from a communications network and/or stored in a computer-readable carrier and/or executable by a microprocessor. According to an embodiment of the invention, such a program comprises program code instructions for the implementation of the steps of the disclosed method.

BRIEF DESCRIPTION OF THE DRAWINGS

The proposed method is described in the following by way of examples in connection with the accompanying figures without limiting the scope of the protection as defined by the claim. The figures show:

DETAILED DESCRIPTION OF ILLUSTRATIVE EMBODIMENTS

1. Main Features of an Embodiment of the Invention

Thanks to the development of hardware capacity, more complex structure is possible in today's wireless communication systems. For multiple data layers in MIMO transmission, one can use multiple decoders. With multiple decoders, some novel IC schemes become possible, which are faster and have similar performance as SIC. In the sequel, the linear form resulting from the two dimensional conditional ML detection is used. A CONDML-IC receiver is proposed, which benefits from multiple decoders and the turbo principle.

An alternative approach is also proposed where a single turbo decoder is used with faster clock rate which may provide an interesting trade-off between area optimization and power consumption.

Thus, the inventors proposed a combination of two techniques. The two combined techniques (i.e. conditional ML and turbo principle) lead to the obtaining of an iterative conditional ML (CONDML) detector for realizing MIMO detection. More specifically, a conditional ML based interference cancellation (CONDML-IC) scheme is proposed in LTE systems. However, the proposed method can be adapted for other wireless transmission system like Wimax.

In other words, it is proposed an iterative conditional ML (CONDML) detector by using feedback from channel decoders to implement interference cancellation (IC) on different layers of the received MIMO signal. The receiver structure is globally described in FIG. 1a and FIG. 1b. In these figures, the received signal y is fed into a new equalizer which is based on CONDML algorithm. This new equalizer comprises two various inputs. Either a standard input (i.e. the signal y) or the feedback data which are obtained from one or more decoder.

Figure 1A:
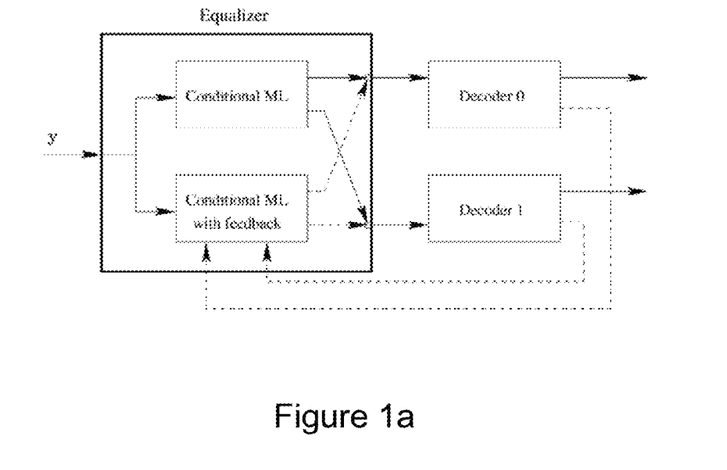
FIG. 1a represents the general structure of an equalizer of an embodiment of the invention with two decoders.
Figure 1B:
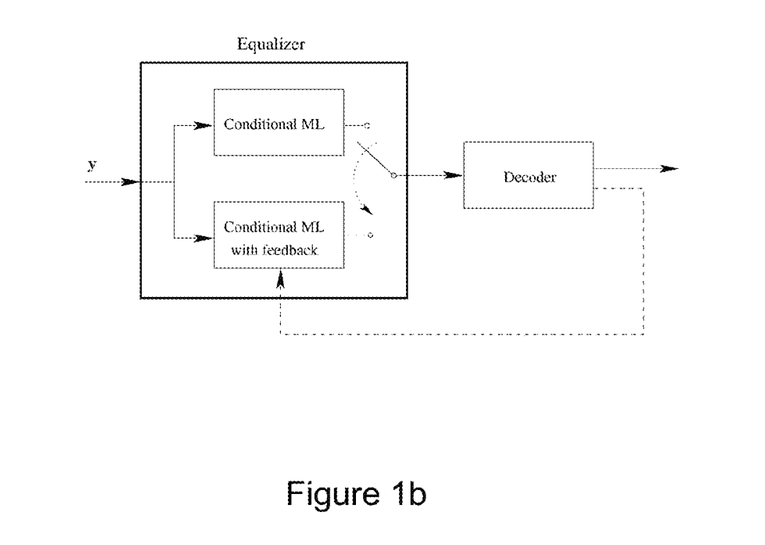
FIG. 1b represents the general structure of an equalizer of an embodiment of the invention with a single decoder.

When there is no feedback from decoder, this new equalizer acts as a conventional conditional ML equalizer; when feedback is available, CONDML with feedback is utilized to perform equalization. Then, in the point of view of the overall process, the obtained log-likelihood rations (LLR) are passed to decoders. In decoding part, one can consider:

either multiple channel decoders to perform decoding for different data layers in parallel (see FIG. 1a where two channel decoders are used).

or a single channel decoder in which the data layers are decoded successively (see FIG. 1b).

If certain criteria are met, some feedback is provided to the equalizer module and the novel CONDML equalizer is utilized to perform interference cancellation by using the feedback. In the sequel, for the sake of simplicity, one will mainly focus on multiple channel decoder case (as represented in FIG. 1a) but the same process can be performed using single channel decoder (as represented in FIG. 1b).

More specifically, the method herein disclosed for cancelling interferences of a received MIMO RF signal, comprise:
a step of receiving a signal y;
an initial step of obtaining, from the received signal y, at least one data representative of the decoded signal, called decoded data. This initial step is implemented for example in a conventional MIMO detection and channel decoding chain (see 5.2.1 where CONDML is implemented for obtaining LLRs and turbo decoding is performed on LRRs).
computing the decoded data in function of at least one predetermined criterion, delivering feedback data and a feedback decision;
and, in function of the feedback decision, at least one iteration of the following steps:
constructing a set of feedback symbols from the feedback data; these feedback symbols are either obtained from hard decision feedback data or soft decision feedback data; the construction is made in a feedback construction module.
obtaining, from the set of feedback symbols (soft or hard), at least one data representative of a feedback decoded signal, called feedback decoded data; this step of obtaining is performed using the new CONDML-IC.
computing the at least one feedback decoded data in function of the at least one predetermined criterion, delivering feedback data.

In a first embodiment, hard decisions (which are bits coming from the decoder) are used in a single complementary iteration (In this case the predetermined number of iterations is 1) to obtain a correct decoded value.

In a second embodiment, some probabilities (which are also called soft decision) are used for the iterations in order to obtain a correct decoded value (the number of iteration is predetermined but is not limited to one).

In other words, the method comprises:
a. Receive the multicarrier signals which are fed into conditional ML detector (y).
b. Implement CONDML to obtain LLRs on each coded bits.
c. After LLR arrangement module, perform turbo decoder based on LLRs.
d. Decide whether feedback based on chosen criterion. If feedback, perform step e; if do not feedback, go to step h.
e. After feedback construction module, LLRs are fed to CONDML detector. Based on the feedback, perform the CONDML-IC and obtain a new batch of LLRs.
f. After LLR arrangement module, perform turbo decoder based on LLRs.
g. If the feedback in step d is hard decision, perform step h; if the feedback in step d is soft, perform the whole steps from d to g until the maximum iterations are obtained.
h. Based on the obtained LLRs on systematic bits, perform final hard decision.

The disclosed method provides the following advantages:
A separate single function can be used for both initial conditional ML and further iterative steps with either soft feedback or hard decision feedback.

With soft information based feedback, performances are improved and approach best achievable performance.

With hard decision and cyclic redundancy check (CRC) based feedback, the improved performance depends on the possibility to have one CRC OK and one CRC KO. One can have higher possibility to have different CRC values when different modulation and coding scheme (MCSs) are used for each layer.

Both soft and hard decision based feedback improve the performances. The improvement depends on the occurrence of different CRC from two code words. When the possibility of different CRCs increases, the improvement will increase almost linearly, resulting in considerable performance improvement.

The decoder architecture can be realized by either two channel decoders or one channel decoders. In particular, instead of two channel decoders one can use one channel decoder to decode the layers successively. In this manner in order to have similar latency at the first iteration one can increase the clock rate of the channel decoder by two. This will have additional advantage in the second iteration also and will lead to more rapid processing for the iterations.

2. Description of Specifics Embodiments

As already exposed, the main principle of an embodiment of the invention is to use feedback which is obtained from a decoder for realizing equalization, this feedback being used in an iterative manner. However, before the feedback can be used, a conventional MIMO detection and channel decoding has to be processed, in order to give sufficient information for realizing the interference cancellation.

2.1. Conventional CONDML

Figure 2:
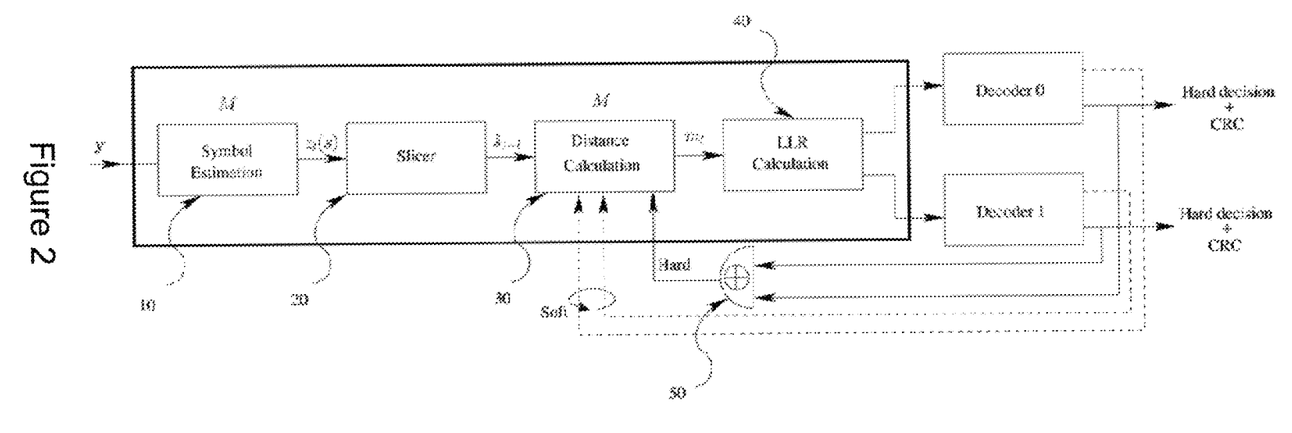
FIG. 2 is a more detailed description of an embodiment of the equalizer of an embodiment of the invention.

In this proposed embodiment of the invention, the conventional CONDML is always used for the first iteration (MIMO detection and channel decoding). As shown in FIG. 2, the conventional CONDML comprises a Symbol Estimation module (10), a Slicer module (20), a Distance Calculation module (30) and a log-likelihood ration (LLR) Calculation module (40).

The MIMO signal comprises a plurality of layer and for a given layer 1, the conventional CONDML can be depicted as:

1) Perform a loop over the M complex symbols $s(b_0, \ldots, b_{t-1})$ of the constellation, where t stands for the number of bits in one complex symbol, this loop comprises:

a) Compute the estimate of symbol transmitted on the $l^{th}$ layer $z_l(s) = c_{1-l}^H(y - c_l s)$ (10), where y is the received signal, s represents all possible points in symbol constellation, $c_{1-l}$ and $c_l$ stand for the columns of channel matrix, and $(\bullet)^H$ means transpose-conjugate operation;

b) Perform slicing (mapping a complex value to the closest point in a constellation of transmitted symbols) based on $z_l(s)$ to get the hard estimate (one point in the constellation) $\hat{s}_{1-l}$ (20);

c) For this current symbol, compute the distance $$m_l(s(b_0, \ldots, b_{t-1})) = \exp\left(-\frac{\|y - c_{1-l}\hat{s}_{1-l} - c_l s\|^2}{\sigma_n^2}\right), \quad (30)$$

where $\sigma_n^2$ stands for the noise variance.

2) For each bit $b_i$ of the t bits carried by symbol $s_l$, compute the LLR as:

Eq. 1
$$\log\left(\frac{\sum_{s_l:b_i=1} m_l(s_l)}{\sum_{s_l:b_i=0} m_l(s_l)}\right). \quad (40)$$

In step 1c) and step 2), the distance and LLR calculations are complex. Some simplified methods can be considered. For example, the max-log solution may be utilized to simplify the LLR calculation, as given by:

Eq. 2
$$\log\left(\frac{\sum_{s_l:b_i=1} m_l(s_l)}{\sum_{s_l:b_i=0} m_l(s_l)}\right) \approx \log\left(\frac{\max_{s_l:b_i=1} m_l(s_l)}{\max_{s_l:b_i=0} m_l(s_l)}\right) \approx$$

$$\underset{s_1:b_i=1}{\arg\max}\, m_l(s) - \underset{s_1:b_i=0}{\arg\max}\, m_l(s),$$

where the notation $$\underset{s_1:b_i=1/0}{\arg\max}$$

indicates that the maximum search is restricted, among the M distances $m_l(s(b_0, \ldots, b_{t-1}))$ over the M/2 distances for which the bit $b_i$ equals 0 or 1, respectively. Further simplifications are possible by simplifying the distance metric defined in (30). In particular, when the M distances are defined as $m_l(s(b_0, \ldots, b_{t-1}))=\|y-c_{1-l}\hat{s}_{1-l}-c_l s\|^2$ the LLR can be derived as:

Eq. 3
$$\underset{s_1:b_i=1}{\arg\min}\, m_l(s) - \underset{s_1:b_i=0}{\arg\min}$$

2.2. Feedback Criteria:

As previously explained, the main principle of an embodiment of the invention is based on the fact that the information obtained from the decoder is used for feedback to the novel equalizer of an embodiment of the invention. However, instead of using this feedback in a blind mode, it can be interesting to decide whether this feedback is useful for the decoder or not. Thus, for estimating the interest of the feedback information, the inventors have found that it can be advantageous to define feedback criteria.

In this section, it is proposed a technique for managing these criteria in a specific case applied to CRC.

In recent wireless communication systems, the CRC is often available and used for different purposes.

In LTE for example, a CRC is a specifically designed code to detect whether a code block is decoded correctly or not. At transmitter side, based on the information bits and some special algorithm, a CRC code is produced and attached to the information sequence. Then, the information bits and the CRC code are encoded together; a code block (CB) is obtained and transmitted. At receiver side, the code block is decoded. Based on the decoded information bits and decoded CRC bits, the receiver decides whether the code block is correctly decoded.

As previously presented, after the conventional CONDML, LLRs are obtained and fed to channel decoders.

After channel decoding, for each data layer, a final CRC can be obtained. In order to decide whether the feedback (the final CRC) is useful or not and how it can be provided, different criteria are proposed for different types of feedback:

1) Case when the CRC feedback are different: when different data layers have different CRC values (one is OK and the other one is KO), the data layers with CRC OK will be fed back to CONDML equalizer for interference cancellation over other data layers. FIG. 2 illustrates an example with two data layers. After decoders, two CRCs are obtained for two code words. The two CRCs are checked by a XOR module:

$$\begin{cases} \text{if } CRC0 = CRC1: & \text{no feedback} \\ \text{if } CRC0 \neq CRC1: & \text{feedback the data layer with } CRC = OK. \end{cases}$$

In present disclosure, this feedback criterion is special for "hard" feedback, which means that the hard decisions of coded bits are fed back to the equalizer (bit equal to 0 or 1).

2) Case where there is a single wrong feedback: when one or more CRC values are KO, all data layers are fed back to the equalizer and the interference cancellation process will be performed over all data layers. This criterion is proposed for "soft" feedback (probabilities of presence of a bit instead of a binary information), which means that the extrinsic information of coded bits, instead of hard decisions (0 or 1), is fed back. By considering the example in FIG. 2, one can express this criterion as $$\begin{cases} \text{if } CRC0 \,\&\, CRC1 = OK: & \text{no feedback} \\ \text{if } CRC0 \,\&\, CRC1 = KO: & \text{feedback all data layers.} \end{cases}$$

2.3. CONDML-IC with Different Feedbacks:

Based on different feedback criteria presented above, two different types of CONDML-IC are proposed in the present disclosure, each of the two criteria presented above corresponding to one specific algorithm. In this embodiment, one criterion corresponds to one special algorithm. Thus, for an algorithm, only one criterion is considered. However, in other embodiments, other criteria can be considered and a specific algorithm can be employed in conjunction with several criteria If the corresponding feedback criterion is met for a certain algorithm, the proposed CONDML-IC is performed to improve system performances. This means that, in this embodiment it has been chosen that performances are not improved if the feedback criterion is not met.

2.3.1. Soft Information Based Feedback

This soft information based feedback leads to the construction of a set of feedback symbols from the feedback data; in this case the feedback symbols are "soft" symbols (i.e. probabilistic symbols) and leads to the use of these soft symbols in conditional ML based on soft information, for obtaining at least one data representative of a "soft" decoded signal, called soft decoded data (in following iterations).

More specifically, considering the current wireless communication systems, the inventors have had the idea using the soft information on all coded bits from channel decoders. Then, all soft information passes the same modules as the coded bits did at transmitter side (i.e. rate match module, scramble module and modulation module which are well known from the one skilled in the art), making the feedback match the actually transmitted bits.

Figure 3:
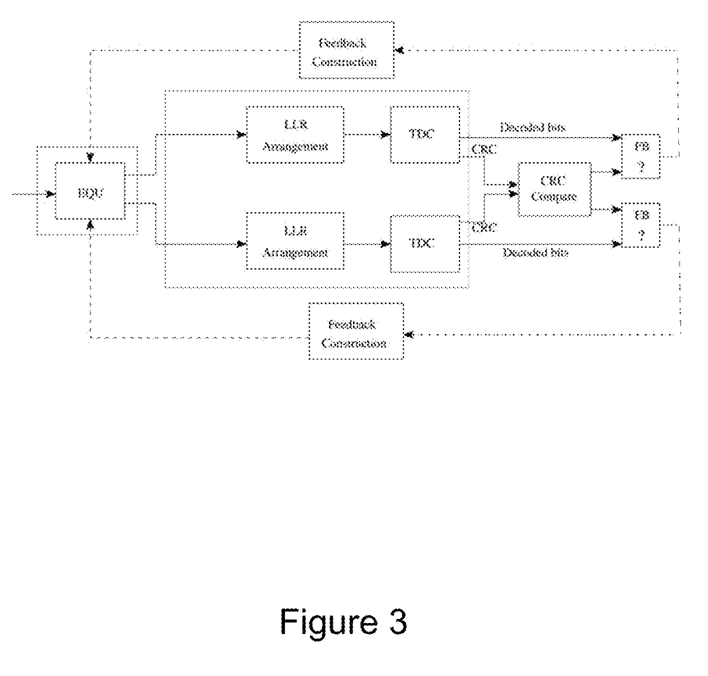
FIG. 3 discloses a receiver structure with interference cancellation.

All these modules (i.e. rate match module, scramble module and modulation module) are modeled as one single "Feedback Construction" module, as shown in FIG. 3. Based on the obtained LLR from the equalizer module (EQU), the probability on each bit $P(b_j)$ can be derived and the soft symbol $\tilde{s}_{1-l}(b_0, \ldots, b_{t-1})$ is calculated in Modulation module as:

$$\tilde{s}_{1-l}(b_0, \ldots, b_{t-1}) = \sum_{k=0}^{M-1} x_k \prod_{i=0}^{t-1} P(b_i),$$

where $x_k$ represents the complex constellation point and $b_i \in x_k$. Then, the inventors have had the idea to use this soft symbol $\tilde{s}_{1-l}$ to replace the estimated symbol $z_l(s)$ in the conditional ML and perform slicing based on this soft symbol.

Thus, the conditional ML based on soft information can be depicted as:
1) perform a loop over the M complex symbols $s(b_0, \ldots, b_{t-1})$ of the constellation, where t stands for the number of bits in one complex symbol
   a) perform slicing based on $\tilde{s}_{1-l}$ to get (20);
   b) compute the distance $m_l(s(b_0, \ldots, b_{t-1})) = \|y - c_{1-l} \hat{s}_{1-l} - c_l s\|$ (30);
2) for each bit $b_i$ of the t bits carried by $s_l$, compute the LLR as Eq. 1 in LLR calculation module (40). Similarly, some simplified LLR calculation methods can be adopted in this step, as shown in Eq. 2 or Eq. 3 serving as an example.

With this soft information based feedback, it is not necessary to calculate $z_l(s)$ (10) which is related to the size of constellation M, while a simple distance calculation is done in step 1b). It is also worth noting that the soft information $\tilde{s}_{1-l}$ can be directly put in distance calculation module (30) to have a fully soft decision based operation.

Also, the steps 1) and 2) can be replaced by a zero forcing (ZF) method which does not need the loop over M complex symbols, resulting in a simpler method.

2.3.2. Hard-decision Based Feedback

This hard-decision based feedback leads to the construction of a set of feedback symbols from the feedback data; in this case the feedback symbols are "hard decision" symbols (i.e. real decoded bits) and leads to the use of these hard decision symbols in conditional ML based on hard decision information.

More specifically, with hard-decision feedback, when the values of CRC for two code words are different (i.e, one OK and the other one KO), the codeword which has the CRC OK is feedback and conditional ML is implemented based on this hard decision feedback.

This method means that the codeword which is more reliable (to correct the other codeword which is not correctly decoded) is chosen.

With the Feedback Construction module (previously described), the second iteration based on hard decision can be depicted as:
1) Check the values of CRC for both code words (50)
   a) If two CRC values are the same, no feedback. The decoding is done.
   b) If two CRC values are different, feedback the hard decisions of codeword having the CRC value OK.
2) Denote the fed back hard decision as $\bar{b}_i$ and the corresponding symbol as $\bar{s}_{1-l}(\bar{b}_0, \ldots, \bar{b}_{t-1})$.
3) Use $\bar{s}_{1-l}$ to perform conditional ML by performing a loop over the M complex symbols $s(b_0, \ldots, b_{t-1})$ of the constellation, where t stands for the number of bits in one complex symbol:
   a) Compute the distance $m_l(s(b_0, \ldots, b_{t-1})) = \|y - c_{1-l} \hat{s}_{1-l} - c_l s\|$ (30);
4) For each bit $b_i$ of the t bits carried by $s_l$, compute the LLR with Eq. 1 or some simplified versions, which can be the max-log algorithm shown in Eq. 2 (40) or more simplified case given in Eq. 3.

With this hard decision and CRC based feedback, the calculation of $z_l(s)$ and slicing whose complexity changes according to the size of constellation M are not needed, since it is only done a simple distance calculation in step 3). Similarly, the steps 3) and 4) can be replaced by a ZF method, which simplifies the proposed equalizer.

Note that the first method (5.2.3.1) can be also implemented based on the CRC feedback used in the second method (5.2.3.2).

3. Hardware Complexity and Implementation

In the proposed CONDML-IC, the same hardware modules of conventional CONDML can be used for CONDML-IC without adding any hardware module to equalizer part. In FIG. 2, the hardware modules are shown for CONDML, including Symbol Estimation, Slicer, Distance Calculation and LLR calculation modules. After decoding, some feedback may be available for the CONDML-IC. With the feedback, the Symbol Estimation and Slicer modules are not utilized anymore, but only the Distance Calculation and LLR calculation modules are needed to perform CONDML-IC. Therefore, for the equalizer part, no additional modules are needed for the proposed method.

FIG. 3 describes an apparatus for implementing the method for cancelling interference according to previously presented embodiments. This apparatus can be depicted as a signal processing unit of a MIMO receiver.

This apparatus comprises an equalizer (EQU) which implements the conditional ML and the conditional ML IC as previously described. This apparatus comprises two turbo-decoders (TDC), one per layer, which allows decoding LLR results obtained by LLR arrangement modules. The turbo-decoders (TDC) output the decoded bits and the CRC.

For the two layers in process, the CRC are compared and a feedback decision is taken in view of this comparison and the decoded bits and/or the probabilities of the decoded bits (FB?). If a feedback is decided, the decoded bits are fed to the feedback construction module (which comprises rate match module, scramble module and modulation module). This feedback construction module realises the construction of the so called feedback symbols (which could be soft symbols when the soft criterion is used or hard decision symbol when the hard decision criterion is used). Thus, the feedback symbol is then fed to the equalizer.

When hard decision is used, there is only a new iteration, as previously explained.

When soft decision is used, a maximum number of iterations can be fixed (i.e. with a predetermined threshold) and when this maximum number of iterations is reached, the iterative process is stopped. However, the iterative process can be stopped even when the maximum number of iteration is not reached when, for example, for both layers CRCs are conform.

Although the present disclosure has been described with reference to one or more examples, workers skilled in the art will recognize that changes may be made in form and detail without departing from the scope of the disclosure and/or the appended claims.

The invention claimed is:

1. A method for cancelling interferences of a received MIMO RF signal, wherein said method comprises:
   a step of receiving a MIMO RF signal y;
   an initial step of obtaining, from said received signal y, at least one data representative of a decoded signal, called at least one decoded data;
   computing said at least one decoded data as a function of at least one predetermined criterion, delivering feedback data and a feedback decision depending on a cyclic redundancy check of the decoded data, comprising:
      a step of obtaining at least two cyclic redundancy checks from said decoded data;
      a step of obtaining a criterion to applied to said at least two cyclic redundancy checks,
      a step of comparing said at least two cyclic redundancy checks; and
      a step deciding whether feedback data are delivered for further processing as a function of said step of comparing and said criterion, delivering the feedback decision;
   and, as a function of said feedback decision, a predetermined number of iterations of the following steps:
      constructing a set of feedback symbols from said feedback data;
      a step of obtaining, from said set of feedback symbols, at least one data representative of a feedback decoded signal, called feedback decoded data;
      computing said at least one feedback decoded data as a function of said at least one predetermined criterion, delivering said feedback data.

2. The method according to claim 1, wherein said at least one predetermined criterion belong to the groups comprising:
   hard decision criterion in which a decision of feedback is taken when the values of said at least two cyclic redundancy checks are different;
   a soft decision criterion in which a decision of feedback is taken when at least one of the two cyclic redundancy checks is wrong.

3. The method according to claim 1, wherein the number of iterations is function of said criterion and a function of said at least two cyclic redundancy checks.

4. The method according to claim 1, wherein said initial step of obtaining at least one decoded data comprises, for M symbols of a current layer of said signal, at least M iterations of the following steps:
   a step of estimating a given symbol of said layer of said signal;
   a step of mapping a complex value to the closest point in a constellation of said estimated symbol, delivering an hard estimate;
   a step of calculating a distance associated to said hard estimate of said constellation as a function of said received symbol;
and, once M distances have been calculated,
   a step calculating log-likelihood ratios (LLR) as a function of said calculated distances; and
   a step of decoding said log-likelihood ratios (LLR), delivering said decoded data.

5. An apparatus for cancelling interferences of a received MIMO RF signal, characterized in that said apparatus comprises:
   means for receiving a MIMO RF signal y
   means for obtaining, from said received signal y, at least one data representative of a decoded signal, called at least one decoded data;
   means for computing said at least one decoded data as a function of at least one predetermined criterion, delivering feedback data and a feedback decision depending on a cyclic redundancy check of the decoded data, comprising:
      a step of obtaining at least two cyclic redundancy checks from said decoded data;
      a step of obtaining a criterion to applied to said at least two cyclic redundancy checks,
      a step of comparing said at least two cyclic redundancy checks; and
      a step deciding whether feedback data are delivered for further processing as a function of said step of comparing and said criterion, delivering the feedback decision;
   means for constructing a set of feedback symbols from said feedback data;
   means for obtaining, from said set of feedback symbols, at least one data representative of a feedback decoded signal, called feedback decoded data; and
   means for computing said at least one feedback decoded data as a function of said at least one predetermined criterion, delivering said feedback data.

6. A non-transitory computer-readable medium comprising a computer program product stored thereon, wherein the program includes instructions of program code for implementing a method of cancelling interferences of a received MIMO RF signal, when the instructions are executed by a processor, wherein the instructions comprise:
   instructions that configure the processor to perform an initial step of obtaining, from said received MIMO RF signal y, at least one data representative of a decoded signal, called at least one decoded data;
   instructions that configure the processor to compute said at least one decoded data as a function of at least one predetermined criterion, delivering feedback data and a feedback decision depending on a cyclic redundancy check of the decoded data, comprising:
      a step of obtaining at least two cyclic redundancy checks from said decoded data;
      a step of obtaining a criterion to applied to said at least two cyclic redundancy checks,
      a step of comparing said at least two cyclic redundancy checks; and
      a step deciding whether feedback data are delivered for further processing as a function of said step of comparing and said criterion, delivering the feedback decision; and
   instructions that configure the processor to perform, as a function of said feedback decision, a predetermined number of iterations of the following steps:
      constructing a set of feedback symbols from said feedback data;
      obtaining, from said set of feedback symbols, at least one data representative of a feedback decoded signal, called feedback decoded data; and
      computing said at least one feedback decoded data as a function of said at least one predetermined criterion, delivering said feedback data.

* * * * *